United States Patent [19]

Abbes et al.

[11] 4,381,869

[45] May 3, 1983

[54] FLEXIBLE JOINT WITH TWO SEALING LINES

[75] Inventors: Claude Abbes, Saint Etienne; Fernando Martinez, Mulhouse; Christian Rouaud, Bourg Saint Andeol, all of France

[73] Assignee: Societe Cefilac, Joints Fargere, St. Etienne Cedex, France

[21] Appl. No.: 227,212

[22] Filed: Jan. 22, 1981

[30] Foreign Application Priority Data

Feb. 21, 1980 [FR] France ............................ 80 03813

[51] Int. Cl.³ .................... F16J 15/00; F16J 9/06; F02F 5/00
[52] U.S. Cl. .................................. 277/236; 277/164
[58] Field of Search ............... 277/236, 180, 235 B, 277/166, 164

[56] References Cited

U.S. PATENT DOCUMENTS 2,521,892  1/1968  Sheesley et al. ............... 277/180
3,433,490  3/1969  Teucher et al. ............. 277/235 B
3,820,799  6/1974  Abbes et al. ..................... 277/236

Primary Examiner—Robert I. Smith
Attorney, Agent, or Firm—Kerkam, Stowell, Kondracki & Clarke

[57] ABSTRACT

Flexible joint with two sealing lines having curvilinear portions, wherein it comprises two closed elementary joints of different length, whose axes are arranged in the same plane, joined together by a shaping template which cooperates at least with the outer joint by excrescences arranged on the outer periphery of the template and defining between them recesses at least level with the curvilinear portions of the joint, each excrescence having a groove in which is received the outer joint, each of the joints having an inner spring with contiguous turns closed on itself and at least one metal casing in which is fitted the spring.

The invention more particularly relates to the construction of non-circular joints.

3 Claims, 5 Drawing Figures

FLEXIBLE JOINT WITH TWO SEALING LINES

BACKGROUND OF THE INVENTION

The present invention relates to a flexible joint with two sealing lines of different perimeters, whereof one is inscribed in the other. It more specifically, but not exclusively, relates to a joint with a non-circular shape having curvilinear portions.

More precisely the invention relates to a joint having two sealing lines constituted by two closed elementary joints of different length and whose axes are located in the same plane. Such a joint provides a double seal between an inner chamber and an outer chamber or a seal of the same quality between an intermediate chamber defined between the joints and the inner and outer chambers, whilst offering the possibility of checking the seal provided by each of the elementary joints.

More specifically the present invention relates to a joint with two sealing lines constituted by two elementary joints of the type having an inner spring with contiguous turns closed on itself and at least one outer metal casing in which is fitted the said spring. A metal joint of this type is described and claimed in French Pat. No. 2 151 186 in the name of the Commisariat a l'Energie Atomique. Compared with conventional elastic joints such as elastomer joints, this type of joint has the essential advantage of being compatible with all media and in particular corrosive or radioactive media.

Flexible joints with two sealing lines and in particular having an annular shape are known, which make it possible to ensure a double seal, whilst permitting an inspection to be made of said seal. However, all the known joints comprise at least one elastic, particularly elastomer, unitary joint positioned outside the metal joint. It has hitherto been impossible, due to the absence of elasticity in the metal joints, to provide such a joint on the outer periphery of a joint having two sealing lines, particularly when said joint has a non-circular shape.

BRIEF SUMMARY OF THE INVENTION

The present invention relates to a flexible joint with two sealing lines having curvilinear portions and constituted by two conventionally manufactured metal joints, such a joint having the advantage compared with prior art joints of ensuring a double seal, which is compatible with all media, provided that the constituent materials are suitably chosen.

To this end a flexible joint with two sealing lines having curvilinear portions constructed according to the invention comprises two closed elementary joints of different length, whose axes are arranged in the same plane, joined together by a shaping template which cooperates at least with the outer joint by excrescences arranged on the outer periphery of the template and defining between them recesses at least level with the curvilinear portions of the joint, each excrescence having a groove in which is received the outer joint, each of the joints having an inner spring with contiguous turns closed on itself and at least one metal casing in which is fitted the spring.

As a result of these characteristics the outer metal joint is supported by the template excrescences which define between them recesses, whose location makes it possible to fit the outer joint by non-elastic deformation thereof level with the non-linear parts of the joint.

According to two constructional variants of the invention the inner metal joint can be mounted on the template either by crimping the edges of a second metal casing of said joint on appropriate surfaces of the template, or in the same way as the outer metal joint by engaging the inner joint on grooves formed in the excrescences regularly distributed over the inner periphery of the template.

According to other constructional variants of the invention the template can either be made in one piece, or by means of two plates rigidly fixed to one another and forming flared portions defining grooves receiving the metal joints. Finally the template can be provided with retractable excrescences which are drawn towards the corresponding joint by springs. This latter variant facilitates the fitting of the joints by engagement, because the non-elastic deformation of the metal joints is replaced by the flattening of the excrescences during fitting.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
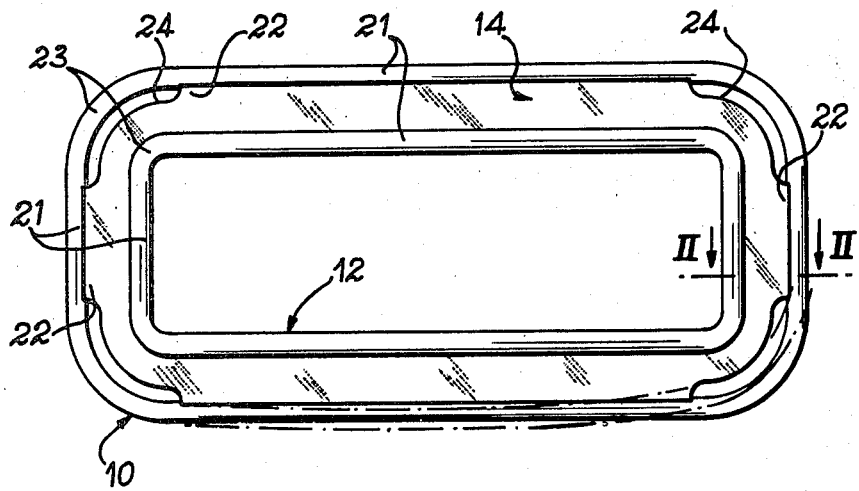
FIG. 1 a plan view showing a flexible joint with two sealing lines and having a rectangular shape, produced according to the teachings of the present invention.

The flexible joint with two sealing lines shown in FIG. 1 is constituted by two elementary joints 10 and 12 interconnected by a shaping template 14. Each of the elementary joints 10 and 12 is a metal joint formed by an inner core 16, a first casing which partly surrounds core 16 and a second casing 20 surrounding the first casing 18. The inner core 16 is constituted by a helical spring with contiguous turns, which is closed on itself and having a circular cross-section. In particular it can be made from steel. The first casing 18 is made from an only slightly ductile metal such as mild steel, whilst the second casing 20 is made from a ductile metal such as aluminium.

Figure 2:
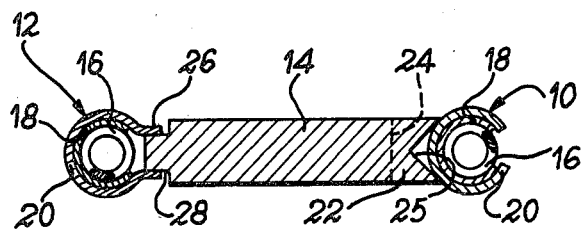
FIG. 2 a sectional larger scale view of the joint of FIG. 1 according to line II—II thereof, showing the fitting of the inner metal joint by crimping.

As illustrated by FIG. 2 the two casings 18 and 20 have in cross-section the shape of a C, whose opening is located in the plane of the joint and is directed towards the outside thereof. The advantages of metal joints of this type are described in detail in French Pat. No. 2 151 186 in the name of the Commisariat a l'Energie Atomique.

As is more particularly illustrated in FIG. 1 each of the joints 10 and 12 is closed and of different length. Each has a non-circular shape, which can be rectangular as illustrated in FIG. 1, or triangular, square, polygonal, etc. In all cases the shape of the joint is such that the linear portions 21 of each of the joints 10 and 12 are interconnected by curvilinear portions 23. Joints 10 and 12 are interconnected by the template 14 in such a way that the axes of these joints are located in the same plane. More specifically and according to the invention template 14 has on its outer periphery excrescences 22, which define between them recesses 24 located at least level with the curvilinear portions 23 joining the linear portions 21 of outer joint 10.

As shown in FIG. 2 each excrescence 22 is terminated by a V-shaped groove 25 in which is held the outer elementary joint 10. As the metal joints lack elasticity, it would be virtually impossible to fit the outer joint 10 without recesses 24 provided on the outer periphery of template 14. Recesses 24 make it possible for joint 10 to provisionally deform towards the interior thereof in the curvilinear portions and towards the exterior thereof with respect to the excrescences 22, as is diagramatically shown by the mixed lines in FIG. 1. Thus, joint 10 can be fitted by engagement in a groove 24, as is illustrated in FIG. 2, despite its lack of elasticity.

In the embodiment shown in FIGS. 1 and 2 the inner joint 12 is fixed by crimping to template 14. To this end the outer casing 20 of joint 12 is provided with longer edges crimped to appropriate surfaces formed on the inner periphery of template 14. More specifically in the represented embodiment the surfaces 28 are parallel to the plane passing through the axes of joints 10 and 12.

In the same first embodiment template 14 is made in one piece, more particularly by milling, and has a thickness which is less than the diameter of joints 10 and 12 in the inoperative state, which makes it possible to limit the flattening of said joints during crimping.

Figure 3:
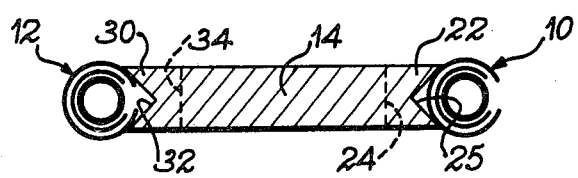
FIG. 3 a sectional view comparable to FIG. 2 showing a constructional variant of the joint according to the invention in which the inner metal joint is mounted by engagement in the same way as the outer joint.

In the second embodiment of the invention shown in FIG. 3 the inner joint 12 is mounted by engagement in the same way as outer joint 10. To this end template 14 is provided on its inner periphery with excrescences 30, terminating by V-shaped grooves 32 in which is received joint 12. The excrescences 30 are separated by recesses 34, which are preferably provided in the curvilinear parts of the joint. Like the recesses 24 for outer joint 10, recesses 34 make it possible for inner joint 12 to deform and permit the fitting thereof by engagement in groove 32, despite its lack of elasticity.

As in the first embodiment template 14 is made in one piece, particularly by milling and makes it possible to limit the flattening of joints 10 and 12 during crimping.

Figure 4:
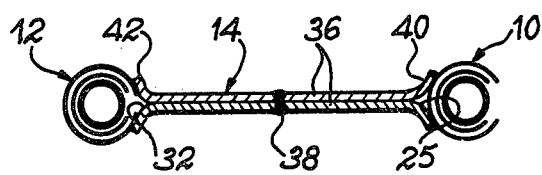
FIG. 4 a sectional view comparable to FIG. 2 showing another constructional variant of the invention in which the template supporting the joints comprises two welded plates.

The variant of FIG. 4 differs from that described hereinbefore with reference to FIG. 3 by the fact that template 14 is made from two stamped metal sheets 36 rigidly fixed to one another by welds 38 and having at their opposite ends flared portions 40 and 42 respectively defining V-shaped grooves 25 and 32 in which are received by engagement joints 10 and 12. Obviously and although not shown in FIG. 4 template 14 also has in this case recesses on its inner and outer periphery at least with respect to the curvilinear portions of the thus formed joint with two sealing lines. These recesses make it possible to fit joints 10 and 12 in grooves 25 and 32 by engagement.

Figure 5:
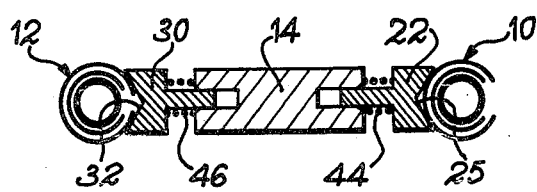
FIG. 5 a sectional view comparable to FIG. 2 showing another constructional variant of the invention in which the template excrescences are retractable in order to facilitate the fitting of the joints.

The variant of FIG. 5 is similar to that described with reference to FIG. 3. It also relates to a joint with two sealing lines in which the template 14 has a certain thickness and consequently limits the flattening of joints 10 and 12. Moreover, template 14 has on its inner and outer periphery excrescences 22 and 30, whose ends defined V-shaped grooves 25 and 32 in which are received by engagement the outer and inner metal joints 10 and 12 respectively. However, this variant differs from that of FIG 3 in that the excrescences 22 and 30 are retractable with respect to template 14. Thus, excrescences 22 and 30 can move towards the inside and outside of the joint in the plane passing through the axes of joints 10 and 12. In this way excrescences 22 and 30 can be retracted counter to the force exerted by springs 44 and 46 drawing the excrescences towards their corresponding joints. This makes it possible to fit joints 10 and 12, without it being necessary for them to undergo any deformation. During the engagement of joints 10 and 12, the excrescences 22 and 30 are drawn towards template 14 counter to springs 44 and 46. They then return to the position shown in FIG. 5 under the action of said springs so as to maintain in place joints 10 and 12.

Obviously the invention is not limited to the embodiments described hereinbefore. Thus, the invention is applicable to any type of joint with two sealing lines, no matter what the shape of the joint. Although the invention is particularly advantageously used in the construction of non-circular joints due to the difficulty in manufacturing said joints, it can also be used for manufacturing circular joints.

What is claimed is:

1. A flexible joint with two sealing lines having curvilinear portions, comprising all metallic components including two closed elementary joints of different lengths, axes for said elementary joints in the same plane, a shaping template joining said elementary joints supporting at least an outer one of said elementary joints by axially related pairs of flanges on an outer periphery of said template, recesses in said template between consecutive pairs of said flanges, said recesses extending at least in curvilinear portions of said flexible joint, said flanges of each of said pairs of flanges defining between them a groove receiving said outer one of said elementary joints, each of said elementary joints comprising an inner spring with contiguous turns closed on itself and at least one metal casing receiving said spring, said shaping template having a thickness which is less than an outer diameter of said elementary joints.

2. A flexible joint according to claim 1, said inner elementary joint including a second outer metal casing of a more ductile metal than the metal of said first casing, said shaping template having an inner periphery including surfaces to which edges of said second metal casing are crimped.

3. A flexible joint according to claim 1, said shaping template being one piece, said thickness of said template limiting the flattening of said inner elementary joint during crimping.

* * * * *